Jan. 9, 1945.  D. GARDNER  2,366,724
PROCESS FOR OXIDIZING OLEFINES TO OLEFINE OXIDES
Filed Feb. 24, 1941
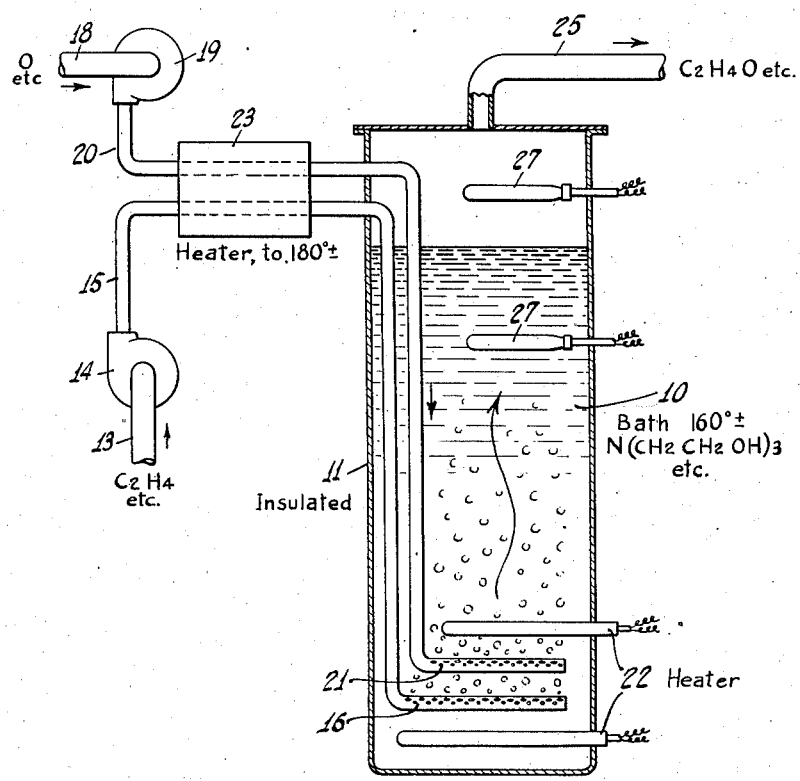
INVENTOR:
Daniel Gardner
BY
Morrison, Kennedy & Campbell
ATTORNEYS.

Patented Jan. 9, 1945

2,366,724

UNITED STATES PATENT OFFICE 2,366,724

PROCESS FOR OXIDIZING OLEFINS TO OLEFIN OXIDES

Daniel Gardner, New York, N. Y., assignor to Gardner Thermal Corporation, a corporation of Delaware Application February 24, 1941, Serial No. 380,284

14 Claims. (Cl. 260—348)

This invention is a novel process for the treatment of olefins or other unsaturated hydrocarbons, on an industrial scale, including the oxidation of the gaseous compounds, preferably in continuous action, and the collection thereof, and with or without the further step of conversion of the oxide to an aqueous or other derivative product, as glycol. The principles hereof are applicable to ethylene, typical of the ethylenic series, including propylene and higher homologues $C_nH_{2n}$; and as well may be used with other unsaturated hydrocarbons, such as those of the acetylenic series $C_nH_{2n-2}$, by adapting thereto such matters as temperature, duration, selection of catalyst and other factors. For explanation purposes the oxidizing of ethylene will be mainly taken as illustrative.

The olefin or ethylene may be in strong concentration obtained in known ways, or may be very dilute as when supplied along with the other gases from a cracking operation.

This invention relates, not to that system of reactions performed wholly at high gas temperatures in gas passages or flues, but to the use of the much lower temperature system wherein the reactions take place in a suitable liquid vehicle, solution or bath, these terms including liquid either maintained in a static body or showered through the tank, column or other vessel used. For example streams of olefin-containing gas and oxygen-containing gas may be forced under pressure into the lower end of a bath in a closed vessel, to meet and bubble up in mutual contact therein and under the influence of certain agents, temperatures etc., as will be described.

An object of the invention is to render practical the liquid vehicle system for this subject; and thereby to permit the use of relatively low temperatures and to avoid the danger existing with high temperatures of disintegration as by isomerization or polymerization of the raw olefin or the oxide product, while ensuring an effective high rate of oxidation and economic production of the ethylene or other oxide or certain later products thereof. Other objects and advantages will appear during consideration of the following disclosure.

First will be afforded a general discussion of the subject, prior knowledge and efforts, the problems existing, the aims sought and the principles involved, followed by specific examples.

Unsaturated hydrocarbons, especially ethylenic hydrocarbons, are comparatively easily attacked by oxidizing agents. The products are oxides which on addition of water can give derivative products, as glycols, which of late are becoming of more and more industrial importance.

By this invention is afforded a system practically adapted for the direct oxidation of ethylenic hydrocarbons, whether in pure or diluted state, by reaction with air or a special oxidizing gas, such as nitrous oxide. A characteristic of the present invention is that the reaction is worked in a liquid medium or bath, preferably organic and suitably alkaline. As will be seen during the following description, several ways can be employed to cause the oxidation of the ethylenic hydrocarbons; but all of these ways have in common that the oxidation is arrived at in the alkaline organic solution or bath and by reason thereof is carried out at an especially low temperature; which condition is of great technical importance, since at a too high temperature the oxide formed has a decided tendency to isomerize. Thus, for instance in the case of ethylene oxide $C_2H_4O$, the isomerization causes it to go over, under alkaline conditions and at the isomerization temperature of 200° into acetic aldehyde or acetaldehyde, thus:

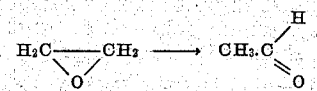

Before entering upon a description of the details of the present invention, some important developments in the prior art may be mentioned. Some fifty years ago, during experiments by G. Wagner, he discovered that, through carefully controlled action of potassium permanganate in an alkaline aqueous solution, ethylene may be oxidized, but becomes converted immediately to ethylene glycol, by the reaction:

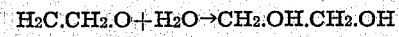

Such prior experiment was not practical nor adapted for industrial use.

Other ethylenic hydrocarbons follow the same rule, so that generally speaking, the following formula can be established:

where R and R′ are any radicals of the series H, $CH_3$, $C_2H_5$, $C_nH_{2n+1}$, or equivalents thereof.

It should, however, be added, that if the oxidation is carried out in a too energetic manner, the double link is split up, and there are obtained, depending upon the structure, organic acids or ketones, and products of their oxidation. The G. Wagner discovery was at a later date patented by the Griesheim firm in German Patent No. 300,192.

Furthermore it is known that the oxidation of ethylenic hydrocarbons can easily go too far if no special measures of precaution are taken; for instance, under the action of ultraviolet light a mixture of ethylene and air may yield the end products of carbon dioxide, carbon monoxide, acetylene and formic acid.

Even if at the start care is taken to produce definite products of oxidation, for instance oxidizing ethylene to ethylene oxide, for example as carried out by Wurtz through the action of a platinum black catalyst, there is always the danger that the oxidation may go further, when the ethylene oxide may for example yield glycolic acid:

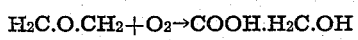

The use of active carbon as a catalytic agent for promoting the reaction of oxidation was suggested in British Patent No. 485,033, but this in itself does not solve the difficulties or afford a satisfactory process.

As far back as about the middle of last century the oxidation of ethylenic hydrocarbons was tried by the aid of gold, silver and copper compounds, while passing a current of air through the system. Thereby the oxide is obtained, which, however, needs special care, since as Wurtz has shown, the oxide is vulnerable, and for example reduces a silver nitrate solution.

Due to the problems thus indicated and existing there was small encouragement to expect success. However after careful study and experiment in relation to the nature of the oxidation of the ethylenic hydrocarbons, particularly in alkaline solution, the present invention was evolved.

There are several most important technical points or factors that require special consideration. These points include the composition of the bath, its temperature, the kind of catalyst and other factors, as will be herein explained.

For the composition of the bath is preferred a liquid vehicle of an organic structure and with a suitable boiling point and other desirable properties, such as the following:

Triethanolamine $N(CH_2CH_2OH)_3$, a colorless, viscous liquid, of density 1.12 and boiling at 277°.

Pyridine $N(CHCH)_2CH$ of density .98, boiling at 115° and therefore requiring the use of lower bath temperatures.

Also found available but inferior are betaine $C_5H_{11}O_2N$ and choline $C_5H_{15}O_2N$. Tripropanolamine is useful.

To render alkaline the selected liquid vehicle or to increase its alkalinity to accord with the preferred process, any of the following agents may be contained or dissolved in the bath: the metal hydroxides or hydrates having densities well above unity, and boiling points amply high, as LiOH and NaOH and KOH and RbOH and CsOH. Ammonium hydrate, of relatively much lower density and boiling point can be dissolved and used in the bath, but to less advantage.

Ammonium hydrate and the five hydroxides of the alkaline metals mentioned have been found to be quite suitable, especially if incorporated in an appropriately selected neutral or alkaline solvent, or if also an organic salt of silver, such as a tartrate, stearate, palmitate, or oleate, or a mixture thereof, be introduced into the solvent.

The best results are obtained by using as the vehicle triethanolamine, tripropanolamine, or pyridine, already mentioned, and incorporating therein catalytical agents, such as the silver salts above enumerated, or silver oxide, or selenium powder, or platinum black or palladium black, as will be explained further below in connection with cited process examples.

Pyridine can be used as a suitable liquid medium, because the benzol ring of pyridine is quite stable toward oxidating agents, as is essential. But as the boiling point 115° of pyridine is relatively low, this vehicle can be employed only in cases wherein the oxidation is to proceed at low temperature and is promoted or accelerated by an energetic catalyst or otherwise. Interesting results can be obtained also when using for or in the solvent or bath such substances as choline or betaine.

As the invention provides for the oxidation of the gaseous hydrocarbons preferably at the lowest practical temperature it is important, while keeping a check on the rate or speed of the supply or passage of the gases, to assist the actual oxidation, first, by preheating the current of air or other oxidizing gas, such as nitrous oxide, and otherwise as by means of introduction of a highly effective catalyst dispersed or dissolved in the basic or alkaline bath. In some cases it may be of further advantage to introduce into the alkaline solvent an auxiliary oxidizing agent of good stability, such as potassium manganate, $K_2MnO_4$, which is stable up to 190°, or potassium nitrite $KNO_2$ or sodium nitrite $NaNO_2$, each of which is stable to a point above 260°. Another way of accelerating the oxidation of the ethylenic hydrocarbons during passage through the alkaline solution, at a continuous and preferably established uniform speed or rate, consists in subjecting the reaction bath to the action of chemical radiation or ultraviolet light. As such radiant action is prompt and effective, it is desirable to choose wave lengths which do not give excessive action, as already stated.

The reacting materials, the olefin and the oxygen, are to be understood in all cases as being conducted to the reaction chamber or space in suitable proportions according approximately with their combining weights, for contact in the basic or alkaline liquid vehicle, thus to afford maximum production while avoiding the dangers of excess oxygen; and regulation of all factors is important, especially in continuous operation.

Having thus indicated the characterizing features of the present invention, some examples may serve conveniently to explain the novelty and scope thereof, and specific embodiments of the principles involved.

*First example*

Ethylene gas supplied in any usual manner is preheated during flow to the reaction vessel, as by passing it through a hot tube or flue section, thus bringing it to a temperature approaching that of the bath, for example between about 160° and 190°. It is then introduced into the bath, for example by blowing it at moderate pressure into the bottom of a column of the liquid vehicle. A suitable bath consists of triethanolamine modified by a 5% solution of ammonium or other nitrate or nitrite. The bath is kept heated up to between about 140° and 180°, preferably about 160° C. In this bath, whether a static body or a spray, the olefin meets with a current of similarly preheated oxygen-supplying air or nitrous oxide. The vehicle temperature in the neighborhood of 140–160–180° is well above the boiling point of the olefin, that of ethylene being —103°; and is well below the boiling point of the vehicle named, which is 277°, and well below the temperature of isomerization of the ethylene oxide, this danger commencing in the neighborhood of 200° under the conditions recited. The alkalinity may be moderate.

In the organic alkaline solution is dispersed the catalyst, which may be finely powdered selenium, soluble in the vehicle, and which under the existing conditions partially oxidizes to selenium dioxide $SeO_2$, having a melting point of 340°. This catalyst acts in a special manner. An equilibrium is established between the selenium and its dioxide, which may be expressed by the following formula:

$$Se + SeO_2 \rightleftarrows SeO_2 + Se$$

It is believed that an oscillating action occurs, with oxygen atoms jumping across from one selenium atom to another, being free during transit, and providing a high activity conducive to the oxidation of the ethylene. It is already known that at a temperature of 228° C., with selenium present to 1.5%, the oxidation of acetylene in sulfuric acid is promoted. Chemical Abstracts vol. 32, 1939, pages 7182 and 7312, contains such disclosure, which tends clearly to demonstrate that neither the selenium nor the selenium dioxide alone can act as a catalyst, but that the active equilibrium described constitutes the catalytic agent capable of accelerating the reaction. With the present invention it has now been found that a similar situation can be created and utilized, whereby ethylenic hydrocarbons or olefins can be oxidized by air in a liquid medium which is alkaline. To this reaction the introduction of a nitrate or nitrite, or both, such as $KNO_2$, particularly favors the oxidation and thus permits it to be carried out at a much lower temperature, desirable for the reasons already explained. Selenium and its dioxide are peculiarly adaptable for the catalytic purpose stated because they do not attack or impair ethylene, nor its oxide, nor glycol.

Under the specified conditions the duly proportioned heated air or nitrous oxide gas current or stream furnishes oxygen steadily which reacts in the alkaline bath, thus yielding a continuous evolution of the desired ethylenic oxide directly produced by oxidation and drawn off regularly as such. It is found useful to install two or more similar alkaline baths and switch over at intervals from one to the other bath, thereby to give each bath a rest, this because in the long run symptoms of fatigue are noticeable.

The selected catalyst is to be maintained in appreciable quantity or strength in the bath, according to known practice in catalysis; and this applies as well to the auxiliary agents, the nitrates, nitrites, etc.; and the circulatory motions of the carrier liquid ensure thorough distribution of all of the introduced agents, and may be supplemented by agitation or stirring as needed.

It has been further found that in lieu of the selenium catalyst there can be used under suitable condition, with practical success, potassium manganate $K_2MnO_4$, by the use of which the reaction takes place at generally similar temperature and speed of gas passage.

Illustrative of this first example is appended a single diagrammatic figure of drawings, with legends indicating specific materials and temperatures. The bath 10 represents any bath, whether liquid sprayed in circulation to fill a vessel or column through which the gases flow and make contact, or, as shown, a column of liquid in an upright vessel 11. The olefin gas or ethylene supply is fed by supply pipe 13, a pump or blower 14 driving the gas through passage 15 to a discharger 16 shown as a perforated length of pipe. Oxygen-containing gas or air, supplied by pipe 18 is forced by blower 19 through passage 20 to discharger 21. The two perforated pipes are placed low to deliver the two gas streams as bubbles ascending in mutual contact through the bath, shown heated by electrical means 22. Any preheating means may warm the gases between blowers and dischargers, such as the heater 23 indicated conventionally. The gases can have outlet from the vessel 11 by the outtake pipe 25. The desired oxide can thus be drawn off as such, to be collected and isolated, or the outlet may conduct it to a water-treatment vessel or tower for the production of glycol.

If acceleration of the oxidation is to be fostered by the application of chemically active rays, such as ultraviolet rays, then the process can be carried out with the bath at a lower temperature, and thus permit a solvent such as pyridine to be used, having a low boiling point. The drawing indicates conventionally a source 27 of ultraviolet rays located within the reaction space.

*Second example*

By a different instance illustrating the principles of the invention, air or an oxidizing gas, such as nitrous oxide, is preheated as before up to about 180° C. (as is also, but separately, the ethylene), but thereupon entered into or treated by a hot solution of tartaric acid $C_4H_6O_6$, whose melting point is 170°, in an organic vehicle, as triethanolamine, into which bath also are introduced and dispersed, prior to the working of the process, at least two different catalytical agents, including a silver salt and powdered selenium. The role of the combination of these two catalysts is special and they are coactive, as seen from the following further explanations.

The silver is used in the form of an organic salt, preferably either silver tartrate $Ag_2C_4H_4O_6$, which decomposes on heating, or silver stearate $AgC_{18}H_{35}O_2$, of melting point 205°. In dispersion in the organic alkaline solution, a portion of the silver becomes deposited upon the walls of the vessel or reaction tube; indeed silver tartrate has at some time been proposed as a bath for silverplating. Another portion of the silver remains in the solution, as in state of suspension. Other silver salts which are suitable for the purpose are the lactate, citrate, oleate, laurate and benzoate. Some organic salts of silver are not suitable for the purpose, since they give explosions on heating, such as the oxalate, which explodes at 140°. If a portion of the silver tends to deposit on the walls in the form of silver oxide $Ag_2O$, which decomposes at 300°, then measures should be taken to ensure that the reacting gases bubble up thoroughly and continuously through the organic solvent bath, in a way to promote an exceedingly close contact between the ethylenic hydrocarbon and the catalytic agent.

The simultaneous presence with the silver agent of the selenium powder dissolved in the vehicle or organic base (which, however, can be replaced by a solution in the vehicle of an alkaline mineral hydrate) permits the oxidation step to be conducted at a lower temperature. It should be said that instead of using a silver compound as a separate agent from the powdered selenium, it is also possible to replace the two by silver selenide $Ag_2Se$, whose melting point is 825°, but which will dissolve in the organic bath.

Interesting yields were also obtained by using as a catalyst thallium selenide $Tl_2Se$, melting point 340°, and tin selenide SnSe₂, melting point 650°. It thus appears in each case that the simultaneous presence of two suitable catalysts favors the reaction of oxidation, and this more particularly if one of the catalysts is a silver compound, or is platinum or gold or palladium black. If one of these blacks is present, the gases should be bubbled through the bath while keeping up a constant stirring of the reacting substances.

*Supplemental remarks*

As indicated, the ethylenic hydrocarbons can be fed to the reaction also in such a diluted state as that which prevails during the modern processes of cracking petroleum derivatives, or in coke oven combustion gases, or in the cracking of resin residues, or as with any other chemical process which through a destructive distillation yields ethylenic hydrocarbons admixed with various other gases which are chemically not affected by the process of oxidation performed in an alkaline vehicle.

Any type of furnace can be employed for the oxidation process hereof, in which an even temperature can be upkept, so as to permit one to establish a continuous process of oxidation, which is to be rigorously controlled by well established kinds of measuring and regulating devices, preferably automatic. However, an electrical resistance heating means for the furnace seems to give more effective and steady results. By the combined action of several supply gases for oxidation and of two catalysts a quicker and more thorough result is obtained, and this at a lower temperature, thus avoiding secondary reactions which may upset the process and particularly the yield thereof.

Small quantities of moisture do not interfere with the process. However, it is recommended to dry the gases before their entry into the reaction zone. Operation in the absence of moisture opens a far larger field of utility since thereby a series of derivatives can be obtained which can be caused to go over to new compounds or solvents of a promising nature. Thus the direct oxidation by air or other oxidizing gases, more particularly nitrous oxide, permits obtaining oxides of ethylenic hydrocarbons, as well as their glycols, and many more remote products. The liquid bath itself should be substantially water-free, that is, devoid of any free water, and it is preferred also that the atmosphere within the chamber, above the liquid bath, should be substantially free of moisture, thus preventing undesirable reactions with the outgoing gaseous products.

A special device should be installed permitting the process to be switched over to a second heated vessel or furnace of similar type, thus to allow for renovating or fortifying the oxidizing bath, after impairment from fatigue or in case the bath has become contaminated or otherwise needs cleaning up.

Striking results have been obtained with this invention in the case of replacing the catalytic selenium compounds by the respective tellurates and tellurides, more particularly by using silver telluride Ag₂Te, with melting point of 995°. Like silver selenide the silver telluride is soluble in ammonia and in triethanolamine. While in no way advocating preference in the use of this particular catalyst, mention of it is made as it throws light on the mechanism of the process.

Once ethylenic oxides are obtained, they can be paired up in order to produce the dioxyethylenic compounds in a well established manner. With ethylaldehyde, ethylene oxides combine to form an ethylene-ethylidene ether, which represents a powerful solvent, with a boiling point of 82.5°

If so desired the ethylenic oxides or their glycols can be transformed by consecutive steps in the same system into other derivatives such as the amino-derivatives or other compounds.

While the present invention has been described as a continuous process, for industrial reasons, it can naturally be performed in a discontinuous manner, batch by batch, with recirculation of the gases or liquids or both until complete oxidation is attained.

The present process affords reactions at such relatively low temperatures that spontaneous disintegration can not take place, whether by isomerization, polymerization or otherwise, of the ethylenic hydrocarbon gas, or its oxide, or the corresponding glycol; and it thus lends itself to the reliable commercial-scale conduct of the process for the production of the desired products.

Throughout this specification preference has been stated for a reaction bath containing an organic vehicle of a basic or alkaline character; but in a broad aspect of the invention the body of the vehicle or bath may be an inert, non-aqueous, inorganic liquid which is stable under the reaction conditions and is adapted to contain the catalyst or other reaction-promoting agents, and to bring them into intimate contact with the supply gases containing the ethylenic and oxygen gases, for reaction at the relatively low temperatures mentioned.

Referring further to the matter of catalysts and auxiliary agents assisting catalysis, various catalyzers have been named at various parts of the hereinabove decription, thus showing that the principles of the invention can be carried out with the use of a wide range of catalyzers, so long as they act effectively to promote the desired oxidation, are themselves stable under the reaction conditions, and are readily distributed in the liquid bath or vehicle, preferably by solution therein. The enumerated catalyzers are subject to approximate classification, and some of them are specified as of particular virtue in carrying out the process of the present invention; wherefore the following summary thereof appears desirable:

(a) A preferred catalyzer is selenium or its compounds, and especially the described oscillating equilibrium SeO₂+Se which can readily be maintained between the dissolved element and its dioxide.

(b) Silver, in the form of an organic salt is of high value, with especial reference to the tartrate, although also mentioned are the stearate, palmitate, oleate, lactate, citrate, laurate and benzoate, and naturally mixtures thereof; but excluding certain others as not available because of explosiveness or otherwise.

(c) Especially recommended was the combination of the selenium and the silver organic salt catalyzers, for example SeO₂+Se mixed with silver tartrate Ag₂C₄H₄O₆. This may be described as a plural or double catalyst, wherein the two substances are coactive, affording teamwork, to substantial advantage in the operation. This principle of plural catalyzers may comprise other components, as for example a combination of thallium selenide and tin selenide.

(d) Various inorganic salts of silver or a similar metal are effective; for example silver selenide $Ag_2Se$ may afford a joint operation somewhat like that above described. Other such components, which are soluble in the organic baths mentioned, include silver telluride, thallium selenide or telluride or tin selenide or telluride. With these may be included certain oxides, such as silver oxide.

(e) Tellurium and many of its compounds are effective, such as the tellurides above mentioned and others, and the tellurates.

(f) Certain other and more commonly used catalyzers may be employed herein such as the metals gold or copper or salts thereof; and the various blacks, especially platinum black, palladium black and gold black.

(g) As auxiliaries, assisting the catalysis were mentioned certain illustrative compounds, including various nitrates or nitrites, such as those of potassium or sodium; and among organic materials tartaric acid $C_4H_6O_6$. An especially favorable addition to the alkaline organic bath is potassium manganate $K_2MnO_4$, which is stable and accelerates the catalytic oxidation.

It is deemed unnecessary to attempt to specify the proportions and strengths to be employed in each of these numerous instances, since industrial chemists familiar with the principles of catalysis understand sufficiently such factors as strengths under various conditions, and trial tests usually being advisable in order to insure optimum results.

A process for treatment of olefins has thus been described which embodies the principles and attains the objects of the present invention; since many matters of operation, order of steps, specific reactions and character of compositions used may be variously modified without departing from the principles of the invention, it is not intended to limit the patent to such matters except to the extent set forth in the appended claims.

What is claimed is:

1. The process for the oxidation of an olefin gas comprising maintaining in a closed vessel an alkaline organic liquid bath which is substantially devoid of free water, and is stable in the reaction conditions, and which carries in dispersion therein an oxidation catalyst of a type adapted to promote in such bath the oxidation of such olefin gas to the oxide of such olefin; keeping said liquid bath at a temperature well above the boiling points of the olefin and its oxide but well below the temperatures of isomerization thereof and below the boiling point of the bath liquid, and passing through such bath for contact therein a supply of a gas containing the olefin and an accompanying supply of an oxidizing gas, selected from the group consisting of gaseous oxygen and air and nitrous oxide, thereby to bring about catalytic reaction between the olefin and oxygen and the resulting production of the oxide of said olefin.

2. The continuous process for the oxidation of an olefin gas comprising maintaining in a closed vessel a non-aqueous bath of a stable organic liquid which is alkaline and carries in dispersion therein an oxidation catalyst of a type adapted to promote in such bath the oxidation of such olefin gas to the oxide of such olefin; keeping said liquid bath at an elevated temperature well above the boiling points of the olefin and its oxide but well below the temperatures of isomerization thereof and below the boiling point of the bath liquid, and passing through such bath for contact therein a supply of a gas containing the olefin and an accompanying supply of an oxidizing gas, selected from the group consisting of gaseous oxygen and air and nitrous oxide, thereby to bring about catalytic reaction between the olefin and oxygen and the resulting production of the oxide of said olefin.

3. The process as in claim 2 and wherein the olefin is supplied as an ingredient in a mixture with saturated hydrocarbons that occur in the gaseous products of an oil cracking process, and the oxygen is supplied in the form of nitrous oxide.

4. The process as in claim 2 and wherein the bath is composed of an alkaline organic liquid of the group consisting of triethanolamine and tripropanolamine and pyridine and betaine and choline.

5. The process for the oxidation of an olefin gas comprising maintaining in a closed vessel an organic liquid bath composed of triethanolamine and which is substantially devoid of free water, is stable in the reaction conditions, and which carries an oxidation-promoting catalyst in dispersion therein consisting of selenium and its dioxide; keeping said liquid bath at a temperature well above the boiling points of the olefin and its oxide but well below the temperatures of isomerization thereof and below the boiling point of the bath liquid, and passing through such bath for contact therein a supply of a gas containing the olefin and an accompanying supply of an oxidizing gas, thereby to bring about catalytic reaction between the olefin and oxygen and the resulting production of the oxide of said olefin.

6. The process for the oxidation of an olefin gas comprising maintaining in a closed vessel a bath composed of an organic liquid of the group consisting of triethanolamine and tripropanolamine and which is substantially devoid of free water, is stable in the reaction conditions, and which carries an oxidation-promoting catalyst in dispersion therein consisting of silver telluride; keeping said liquid bath at a temperature well above the boiling points of the olefin and its oxide but well below the temperatures of isomerization thereof and below the boiling point of the bath liquid, and passing through such bath for contact therein a supply of a gas containing the olefin and an accompanying supply of an oxidizing gas, thereby to bring about catalytic reaction between the olefin and oxygen and the resulting production of the oxide of said olefin.

7. The continuous process for the oxidation of an olefin gas comprising maintaining in a closed vessel a non-aqueous bath of a stable organic liquid which is alkaline and carries an oxidation-promoting catalyst in dispersion therein; keeping said liquid bath at an elevated temperature well above the boiling points of the olefin and its oxide but well below the temperatures of isomerization thereof and below the boiling point of the bath liquid, and passing through such bath for contact therein a supply of a gas containing the olefin and an accompanying supply of an oxidizing gas, thereby to bring about catalytic reaction between the olefin and oxygen and the resulting production of the oxide of said olefin; the catalyst dispersed in the reaction bath being of the group consisting of (a) selenium in a state partially converted to its dioxide and operative to provide free oxygen for the reaction, and (b) such selenium catalyst in mixture with an organic silver salt of the group consisting of the tartrate, stearate, lactate, citrate, oleate, laurate, benzoate and mixtures thereof.

8. The continuous process for the oxidation of an olefin gas comprising maintaining in a closed vessel a non-aqueous bath of a stable organic liquid which is alkaline and carries an oxidation-promoting catalyst in dispersion therein; keeping said liquid bath at an elevated temperature well above the boiling points of the olefin and its oxide but well below the temperatures of isomerization thereof and below the boiling point of the bath liquid, and passing through such bath for contact therein a supply of a gas containing the olefin and an accompanying supply of an oxidizing gas, thereby to bring about catalytic reaction between the olefin and oxygen and the resulting production of the oxide of said olefin; the catalyst dispersed in the reaction bath being an organic silver salt of the group consisting of tartrate, stearate, palmitate, oleate, and mixtures thereof.

9. The continuous process for the oxidation of an olefin gas comprising maintaining in a closed vessel a non-aqueous bath of a stable organic liquid which is alkaline and carries an oxidation-promoting catalyst in dispersion therein; keeping said liquid bath at an elevated temperature well above the boiling points of the olefin and its oxide but well below the temperatures of isomerization thereof and below the boiling point of the bath liquid, and passing through such bath for contact therein a supply of a gas containing the olefin and an accompanying supply of an oxidizing gas, thereby to bring about catalytic reaction between the olefin and oxygen and the resulting production of the oxide of said olefin; the catalyst dispersed in the reaction bath being one of the group consisting of the selenides and tellurides of silver, tin, and thallium and mixtures thereof.

10. The process for the oxidation of an olefin gas comprising maintaining in a closed vessel an organic liquid bath composed of a liquid of the group consisting of triethanolamine and tripropanolamine and pyridine and betaine and choline and which is substantially devoid of free water, and is stable in the reaction conditions, and which carries in dispersion therein an oxidation catalyst of a type adapted to promote in such bath the oxidation of such olefin gas to the oxide of such olefin; keeping said liquid bath at a temperature well above the boiling points of the olefin and its oxide but well below the temperatures of isomerization thereof and below the boiling point of the bath liquid, and passing through such bath for contact therein a supply of a gas containing the olefin and an accompanying supply of an oxidizing gas selected from the group consisting of gaseous oxygen and air and nitrous oxide, thereby to bring about catalytic reaction between the olefin and oxygen and the resulting production of the oxide of said olefin.

11. The process for the oxidation of an olefin gas comprising maintaining in a closed vessel an organic liquid bath composed of a liquid of the group consisting of triethanolamine and tripropanolamine and which is substantially devoid of free water, and is stable in the reaction conditions, and which carries in dispersion therein an oxidation catalyst of a type adapted to promote in such bath the oxidation of such olefin gas to the oxide of such olefin; keeping said liquid bath at a temperature well above the boiling points of the olefin and its oxide but well below the temperatures of isomerization thereof and below the boiling point of the bath liquid, and passing through such bath for contact therein a supply of a gas containing the olefin and an accompanying supply of an oxidizing gas selected from the group consisting of gaseous oxygen and air and nitrous oxide, thereby to bring about catalytic reaction between the olefin and oxygen and the resulting production of the oxide of said olefin.

12. The process for the oxidation of an olefin gas comprising maintaining in a closed vessel an organic liquid bath composed of pyridine and which is substantially devoid of free water, and is stable in the reaction conditions, and which carries in dispersion therein an oxidation catalyst of a type adapted to promote in such bath the oxidation of such olefin gas to the oxide of such olefin; keeping said liquid bath at a temperature well above the boiling points of the olefin and its oxide but well below the temperatures of isomerization thereof and below the boiling point of the bath liquid, and passing through such bath for contact therein a supply of a gas containing the olefin and an accompanying supply of an oxidizing gas selected from the group consisting of gaseous oxygen and air and nitrous oxide, thereby to bring about catalytic reaction between the olefin and oxygen and the resulting production of the oxide of said olefin.

13. The process for the oxidation of an olefin gas comprising maintaining in a closed vessel an organic liquid bath composed of a liquid of the group consisting of betaine and choline and which is substantially devoid of free water, and is stable in the reaction conditions, and which carries in dispersion therein an oxidation catalyst of a type adapted to promote in such bath the oxidation of such olefin gas to the oxide of such olefin; keeping said liquid bath at a temperature well above the boiling points of the olefin and its oxide but well below the temperatures of isomerization thereof and below the boiling point of the bath liquid, and passing through such bath for contact therein a supply of a gas containing the olefin and an accompanying supply of an oxidizing gas selected from the group consisting og gaseous oxygen and air and nitrous oxide, thereby to bring about catalytic reaction between the olefin and oxygen and the resulting production of the oxide of said olefin.

14. The continuous process for the oxidation of an olefin gas comprising maintaining in a closed vessel a non-aqueous bath of a stable organic liquid which is alkaline and carries in dispersion therein an oxidation catalyst of a type adapted to promote in such bath the oxidation of such olefin gas to the oxide of such olefin; keeping said liquid bath at an elevated reaction temperature well above the boiling point of the olefin and its oxide but well below the temperatures of isomerization thereof and below the boiling point of the bath liquid, and preheating approximately to the reaction temperature and passing through such bath for mutual contact therein a supply of a gas containing the olefin and an accompanying supply of an oxidizing gas selected from the group consisting of gaseous oxygen and air and nitrous oxide, namely, by conducting them respectively by separate paths into the liquid bath, thereby to bring about catalytic reaction between the olefin and oxygen and the resulting production of the oxide of said olefin.

DANIEL GARDNER.